United States Patent

Meiritz et al.

[11] Patent Number: 5,169,524
[45] Date of Patent: Dec. 8, 1992

[54] FILTER RING

[76] Inventors: Horst Meiritz, Unter Nang 51, 7470 Albstadt-2; Jörg Sebig, Auf Gstangen 2, 7460 Balingen-12; Christian Haasis, Kennen-Steige 18, 7470 Albstadt, all of Fed. Rep. of Germany

[21] Appl. No.: 650,908
[22] Filed: Feb. 5, 1991

[30] Foreign Application Priority Data

Nov. 27, 1990 [DE] Fed. Rep. of Germany ....... 9016138

[51] Int. Cl.⁵ .............................................. B01D 29/13
[52] U.S. Cl. ..................................... 210/232; 55/497; 210/495
[58] Field of Search .................... 210/232, 495; 55/497

[56] References Cited

U.S. PATENT DOCUMENTS 4,207,189  6/1980  Geuenich ........................... 210/231
4,690,757  9/1987  Mathus et al. ...................... 210/232

Primary Examiner—Ivars Cintins

[57] ABSTRACT

A filter ring is described for insertion in ring-shaped apertures or openings of the wall of hollow bodies containing or through which gases or liquids flow. In its wall surrounding a hollow space, the ring has a longitudinal slit extending parallel to the axis of the ring along the entire axial length of the ring, the wall portions of the ring located to both sides of the slit being joined with one another by a snap lock. In accordance with the invention, this snap lock has at least two projections which are arranged in the one wall portion of the ring in an axial direction and which are snappable into grooves arranged equally adjacent to one anotehr on the other wall portion. The projections and grooves extend over the entire thickness of the ring wall and have side surfaces undercut in the joint direction and engage one another from behind.

6 Claims, 2 Drawing Sheets

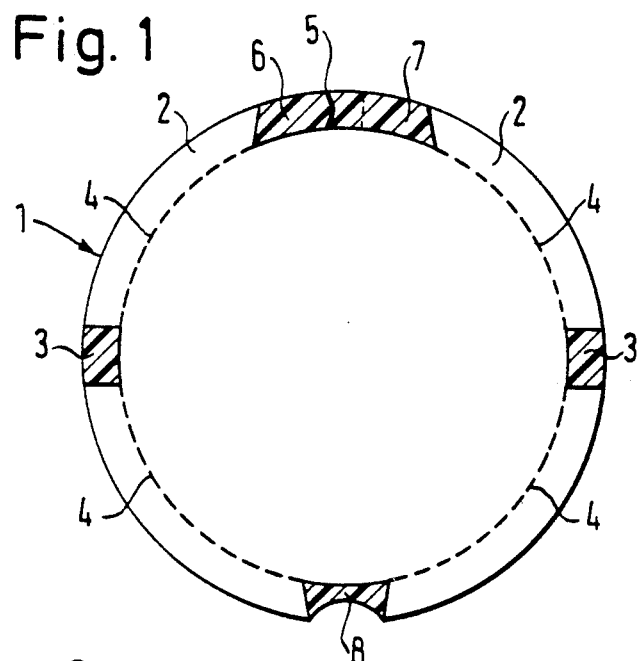
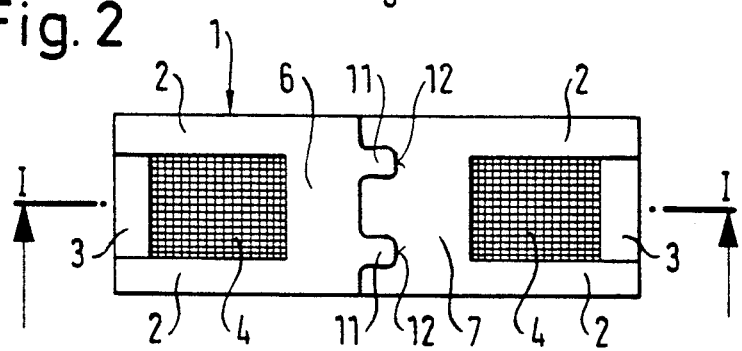
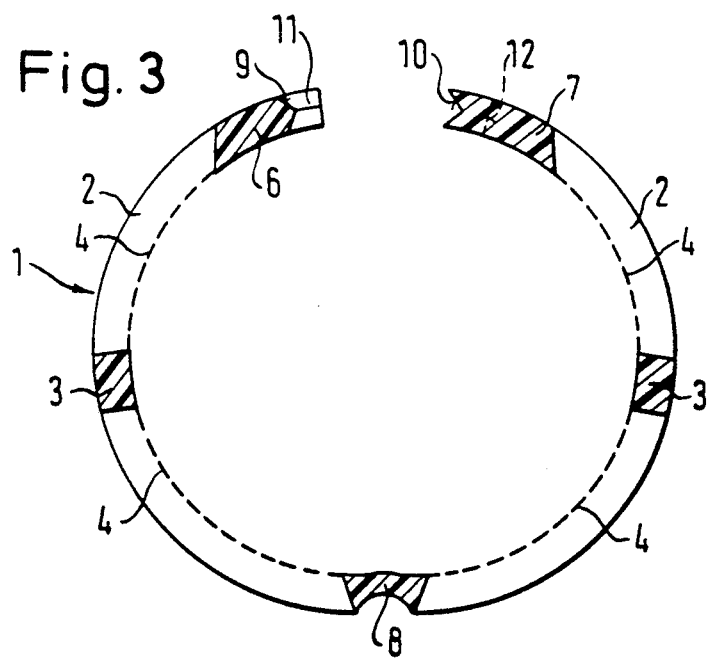

FILTER RING

BACKGROUND OF THE INVENTION

The invention relates to a filter ring to be inserted in ring-shaped apertures or openings in the wall of hollow bodies containing or through which gases or liquids flow, the filter ring having a slit in its wall, which surrounds a hollow space, the slit extending parallel to the ring axis along the entire axial length of the ring, wherein the wall portions of the ring located to both sides of this slit are joined with one another by a snap lock. A filter ring of this kind is being brought onto the market by the applicant for several months.

Filter rings of this type are as a rule inserted in grooves arranged on the outer side of the wall of the hollow body, for example the wall of a pipe, the groove being provided in the region of the aperture or opening of the hollow body wall. For insertion into these grooves, the filter rings must be widened or opened to enable them to be pushed over the outer wall of the hollow body. The slit provided in the previously mentioned, known filter ring extending over the entire axial length of the ring is provided for this purpose, the slit enabling a separation of the ring wall at one peripheral location of the filter ring and thus enabling the widening of the filter ring to a ring diameter which allows the ring to be pushed over the outer surface of the hollow body. After the insertion of the filter ring into the groove, the pushing together of its wall portions located to both sides of the slit and the secure joining of these by means of the snap lock, the ring can be closed and returned to its initial diameter which corresponds to the diameter of the base of the groove.

In the known filter ring, the snap lock is formed by means of a catch rib which is arranged on one wall portion of the ring, extends over the entire axial length of the ring and which can catch in a groove equally arranged and extending over the other wall portion. As the catch should be secure, the side surfaces of the catch rib and the catch groove lying opposite one another are undercut in such a manner that they grip into each other (clip lock). However, this design requires a relatively large wall thickness of the ring, as the undercut catch rib and groove are not practical in a thin-walled ring for reasons of space and fastness.

SUMMARY OF THE INVENTION

It is therefore an object of the present invention to form the joint of the wall portions located to both sides of the slit in a filter ring of the type initially referred to in such a manner that it is practicle even in relatively thin-walled rings. This is achieved in accordance with the invention in such a manner that the snap lock serving to join both wall portions has at least two projections which are arranged adjacent one another on the one wall portion of the ring in the axial direction thereof and which are snappable into equally adjacently arranged grooves on the other wall portion of the ring, that the projections and grooves extend over the entire thickness of the ring wall and have side surfaces which are undercut in the direction of the joint and which engage one another from behind. The side surfaces which engage one another from behind can have a dovetailed shape as seen in the side view of the ring wall. In this inventive formation, the snap lock can also be arranged on the wall of a relatively thin-walled filter ring without impairing the fastness of the filter ring and the snap joint.

For exactly centering the wall portions to be joined with one another, the front surfaces of these wall portions can be profiled, for example in an arrow shape, to push against one another into a joined condition and engage with one another in this condition. Furthermore, the projections and grooves of the snap joint can be profiled at their opposing side walls to engage with one another. Both profiles can be arrow-shaped.

BRIEF DESCRIPTION OF THE DRAWINGS

In the drawing, a particularly advantageous, exemplified embodiment is shown which is described in more detail as follows:

FIG. 1 shows the filter ring of this embodiment in cross-section;

FIG. 2 is a side view of this ring,

FIG. 3 shows this ring in an opened condition in cross-section as in FIG. 1,

DETAILED DESCRIPTION OF THE PREFERRED EMBODIMENTS

Figure 5:
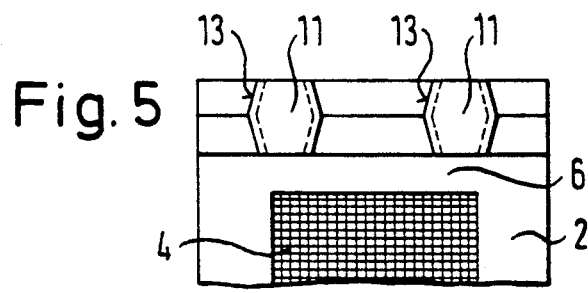
FIG. 5 is a front view in the direction of the arrow A in FIG. 4 of the portions of the snap lock having the snap projections.
Figure 4:
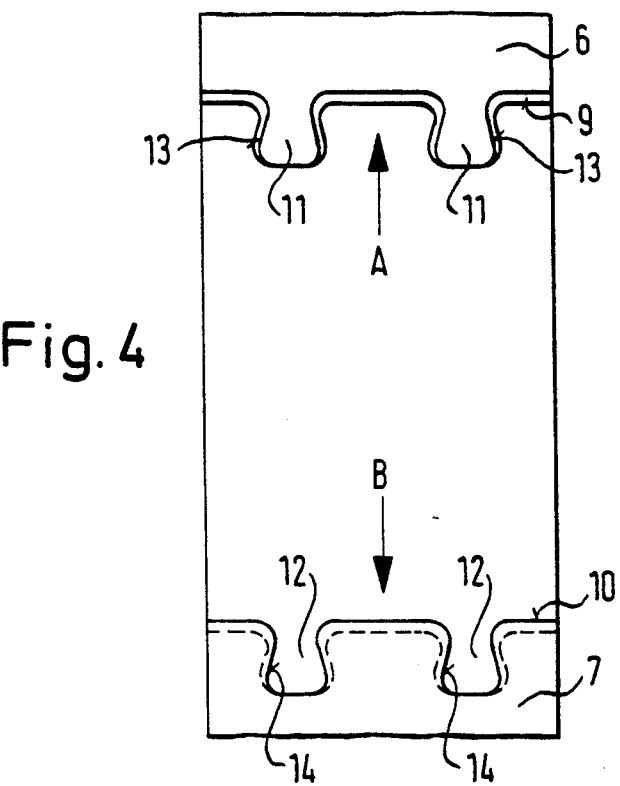
FIG. 4 is an enlarged depiction in detail of the snap lock of this filter in a side view of the ring.

The cylindrical wall of the filter ring 1 shown in the drawing has a frame which is formed by two ring-shaped webs 2 respectively located on the front ends of the filter ring and joining webs 3 joining together with these which extend in the axial direction of the filter ring. Fixed into these on the inside of this frame is a filter web 4 through which gas or a liquid subjected to filtering can flow between the frame webs 2, 3. The filter web 4 can be welded into the frame portions 2, 3, 6, 7 and 8. One of the joining webs 3 is separated into two wall portions 6 and 7 by a longitudinal slit 5 which extends over the entire axial length of the ring. The joining web lying diametrically opposite is formed by material weakening as a hinge 8 by means of which the wall portions 6, 7 of the ring located on both sides of the separating slit 5 can be moved away from one another by the widening thereof. In the closed condition of the filter ring, both portions 6, 7 lie with their arrow-shaped, profiled front surfaces 9, 10 against one another.

In order to enable a secure hold of the portions separated by the slit 5 of the filtering ring 1 in the condition positioned on the hollow body or inserted in the groove thereof, two dovetail-shaped snap projections 11 are provided on the one portion 6, which snap projections are arranged in special relationship in the axial direction of the ring adjacent one another and may be snapped into equally dovetail-shaped grooves 12 arranged on the other wall portion 7.

Figure 6:
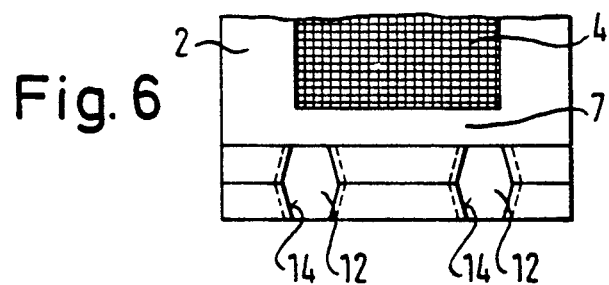
FIG. 6 is a front view in the direction of the arrow B in FIG. 4 of the portions of the snap lock having the grooves.

The projections and grooves extend over the entire thickness of the ring wall, as may be seen in FIGS. 3, 5 and 6. The side walls 13 and 14 of the snap projections 11 and grooves 12 opposing one another are also profiled with an arrow shape to engage into one another so that an exact mutual centering or aligning of both portions 6, 7 of the ring wall is given in the position in which these are connected together.

What is claimed is:

1. A filter ring adapted to be inserted into a ring-shaped aperture or opening of a wall of a hollow body containing or through which gases or liquids flow, the filter ring comprising an annular ring-shaped body defining an axis and having an axial length and a radial thickness, the annular body including:

first and second adjacent wall portions, each of said wall portions having a respective annular end face, the end faces defining a slit to allow the first and second wall portions to flex away from each other; and a snap lock to connect together the first and second wall portions, the snap lock including
  i) first and second adjacent grooves extending into the first wall portion, from the end face thereof, and
  ii) first and second adjacent projections connected to and extending outward from the end face of the second wall portion, the first and second projections being adapted to lock releasably into the first and second grooves respectively, each of the projections and each of the grooves extending along the entire radial thickness of the annular ring, each of the projections and each of the grooves having a respective pair of undercut surfaces, the undercut surfaces of the first groove being adapted to seat against the undercut surfaces of the first projection, and the undercut surfaces of the second groove being adapted to seat against the undercut surfaces of the second projection to hold the first and second projections in the first and second grooves against annular movement out of said grooves.

2. Filter ring according to claim 1, wherein the projections and grooves have an essentially dovetail shape when seen in a side view of said end faces.

3. Filter ring according to claim 1, wherein said end faces of both wall portions are profiled to push against one another into a joined condition and engage with one another.

4. Filter ring according to claim 3, wherein the profile has an arrow shape.

5. Filter ring according to claim 1, wherein the projections and grooves are profiled to engage with one another at their side walls lying opposite each other.

6. Filter ring according to claim 5, wherein the profiling is arrow-shaped.

* * * * *